United States Patent Office.

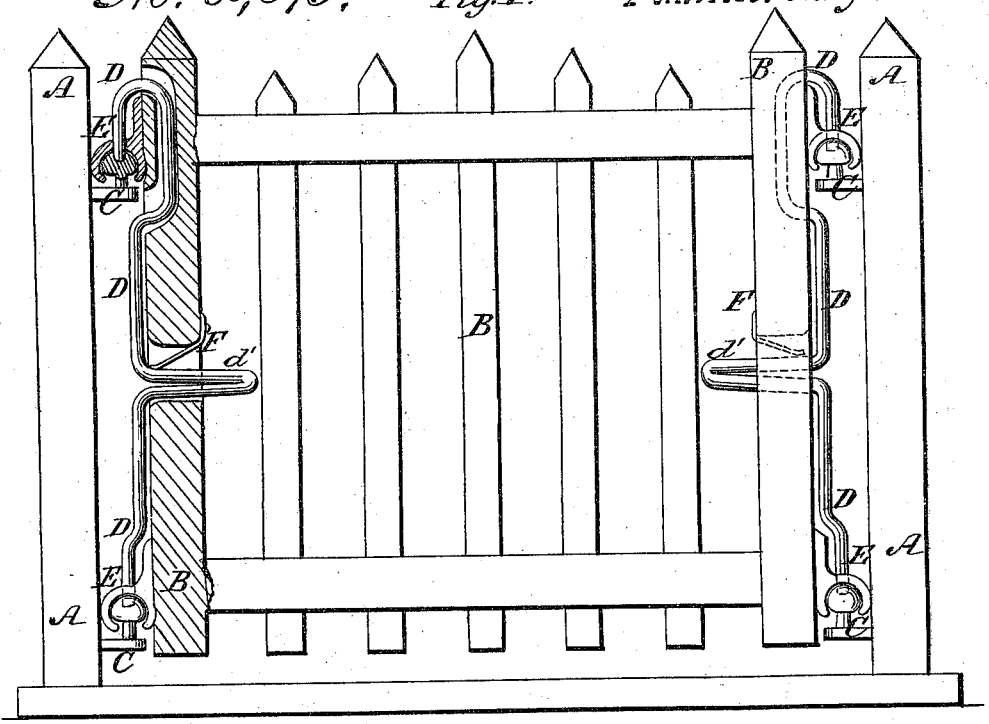
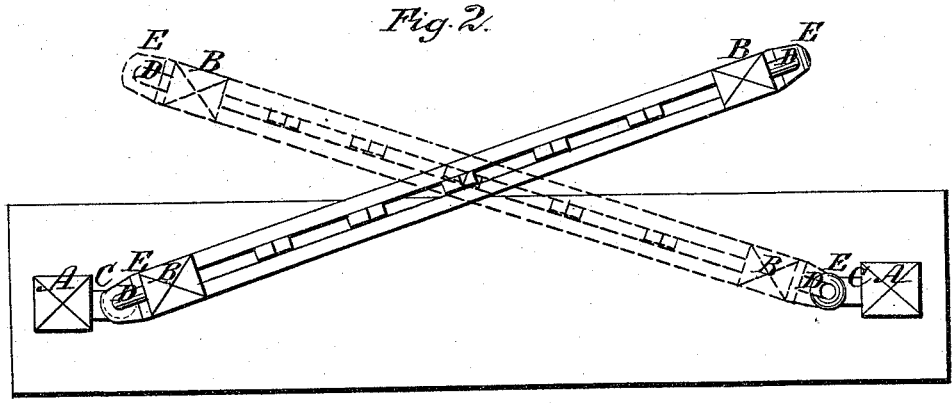

JOHN W. EVERHAM, OF PITTSGROVE, NEW JERSEY.

Letters Patent No. 89,978, dated May 11, 1869.

IMPROVED GATE-HINGE.

The Schedule referred to in these Letters Patent and making part of the same.

*To all whom it may concern:*

Be it known that I, JOHN W. EVERHAM, of Pittsgrove, in the county of Salem, and State of New Jersey, have invented a new and improved Gate-Attachment; and I do hereby declare that the following is a full, clear, and exact description thereof, which will enable others skilled in the art to make and use the same, reference being had to the accompanying drawing forming part of this specification, in which—

Figure 1 is a side view of my improved gate, partly in section through one of the end bars of the gate.

Figure 2 is a top view of the same, showing in black lines the gate opened at one end, and in red lines the gate opened at the other end.

Similar letters of reference indicate corresponding parts.

My invention has for its object to furnish an improved gate-attachment, which shall be so constructed and arranged as to serve either as a hinge or latch, as occasion may require ; and It consists in the construction and combination of the various parts of the machine, as hereinafter more fully described.

A are the gate-posts, and B is the gate, about the construction of which parts there is nothing new.

C are the pivots, the shanks of which are securely attached to the posts A, two to each, and which are made in the form of knobs, and have holes in their tops to receive the ends of the latch D.

E are the eyes, which are made in the form shown in fig. 1, so as to fit upon the knobs C, and clasp said knobs, as shown, so as to prevent the gate from being lifted when the latch is in place, the ends of which latch pass through holes in the tops of said eyes, or jaws, to enter the holes in the knobs, or pivots C.

The eyes, or jaws E are attached to the end-bars of the gate B, by screws, or by being formed upon or attached to shanks, or bolts passing through said end-bars, and being secured in place by nuts.

This construction I prefer, as being stronger and more readily attached.

The latches D are made of a bar of iron, bent into such a form, that its ends may pass through the holes in the eyes, or jaws E, and into the sockets, or holes in the knobs, or pivots C, as shown in fig. 1.

The particular form of the latch D is immaterial, so long as its upper and lower ends may both pass down vertically into the holes in the eyes E and knobs C.

$d$ is an arm, formed upon or attached to the latch D, which passes through a mortise, or slot in the end-bar of the gate, and projects so as to serve as a handle in unlatching the gate.

F is a spring, placed in the slot of the end gate-bar, above the arm $d'$, to force the latch D down promptly when the gate is swung shut.

In the case of large gates, the weight of the latch itself will be sufficient to cause it to drop down, so that its ends will enter the holes in the knobs C, and the spring F will not be required.

By this construction, the gate may be opened in either direction and at either end, with the same facility, and should one end of the gate sag, the other end may be used until it has recovered itself, or begins to sag in the other direction.

Having thus described my invention,

What I claim as new, and desire to secure by Letters Patent, is—

The pivots, or knobs C, eyes, or jaws E, and latch D, in combination with each other, said parts being constructed and operating in connection with each other, and in connection with the posts and gate, substantially as herein shown and described, and for the purposes set forth.

JOHN W. EVERHAM.

Witnesses:
GEO. M. ELWELL,
JAS. W. DU BOIS.